July 31, 1945.　　　W. WENNMANN　　　2,380,564
CAKE SLITTING MACHINE
Filed July 26, 1944　　　4 Sheets-Sheet 4
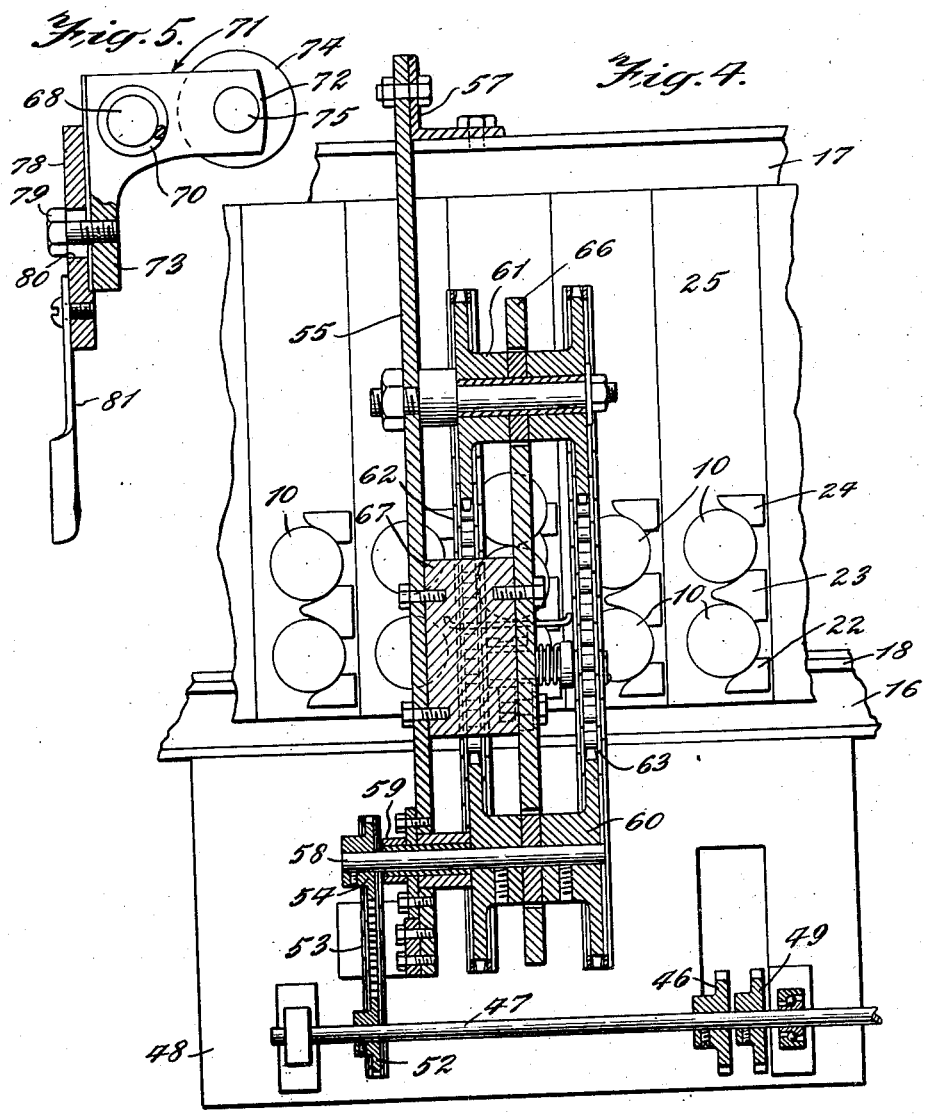
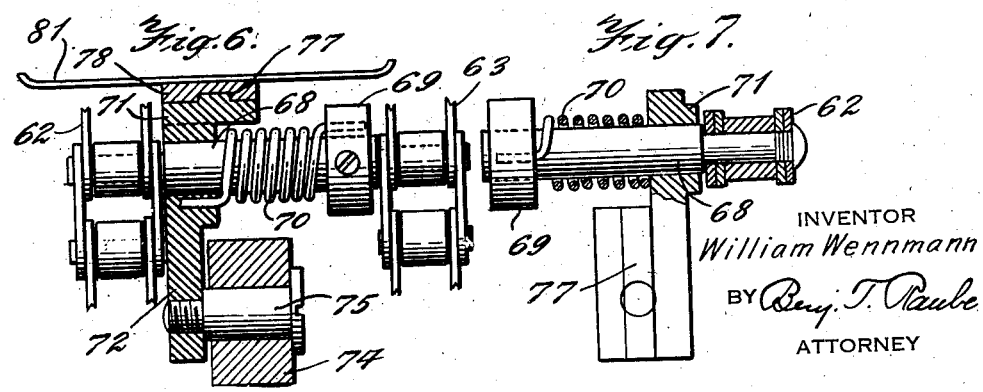
INVENTOR
William Wennmann
BY Benj. T. Raube
ATTORNEY Patented July 31, 1945

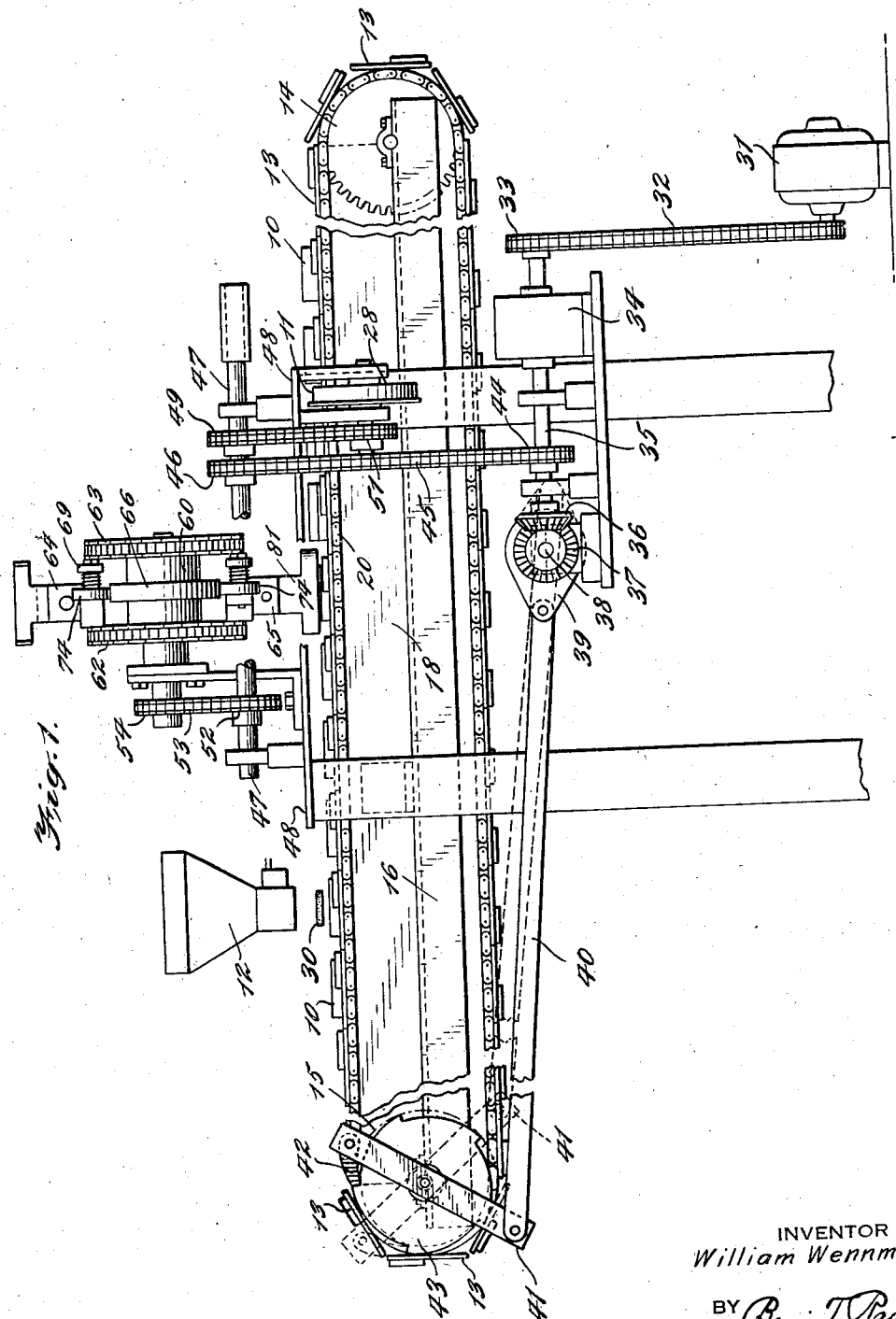

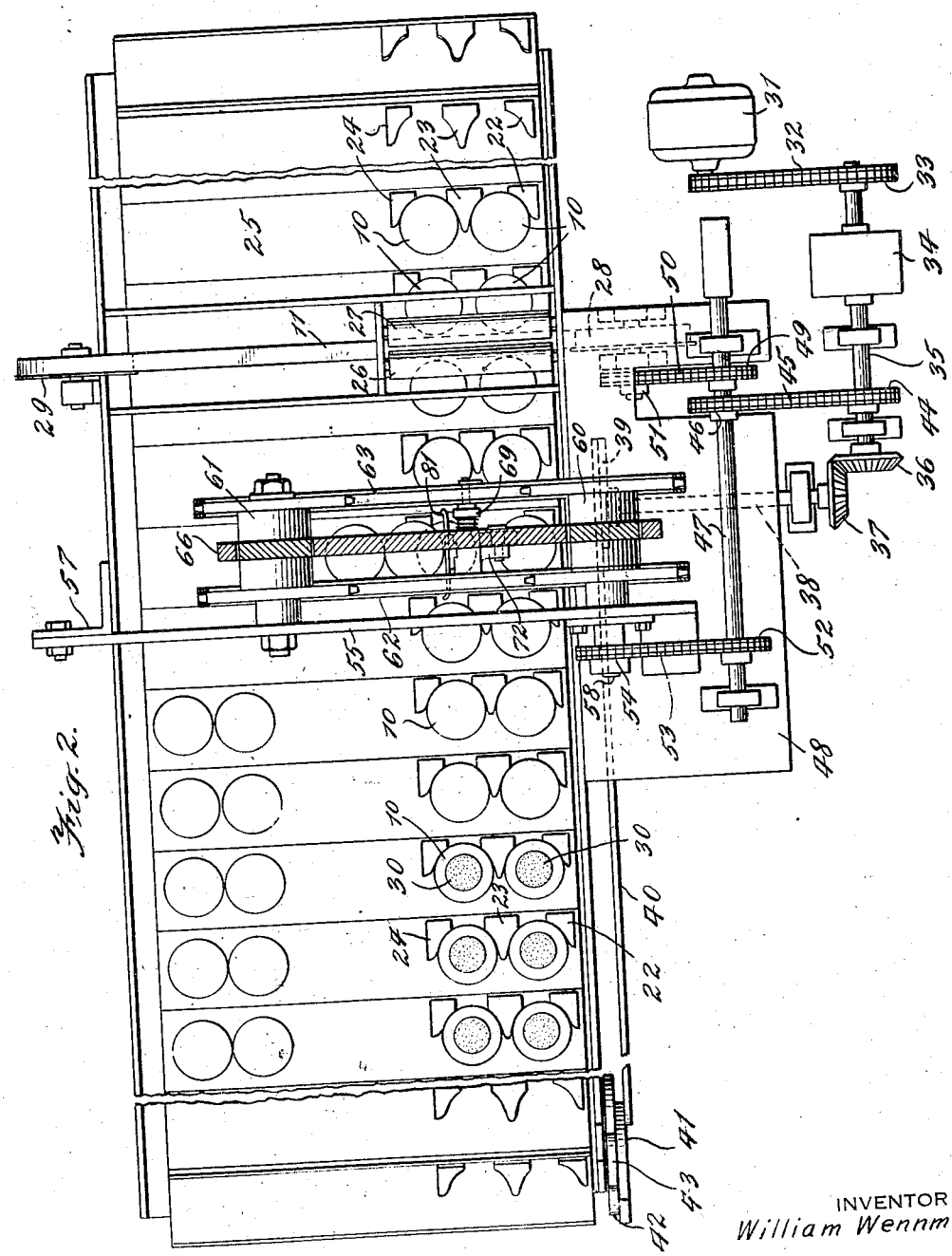

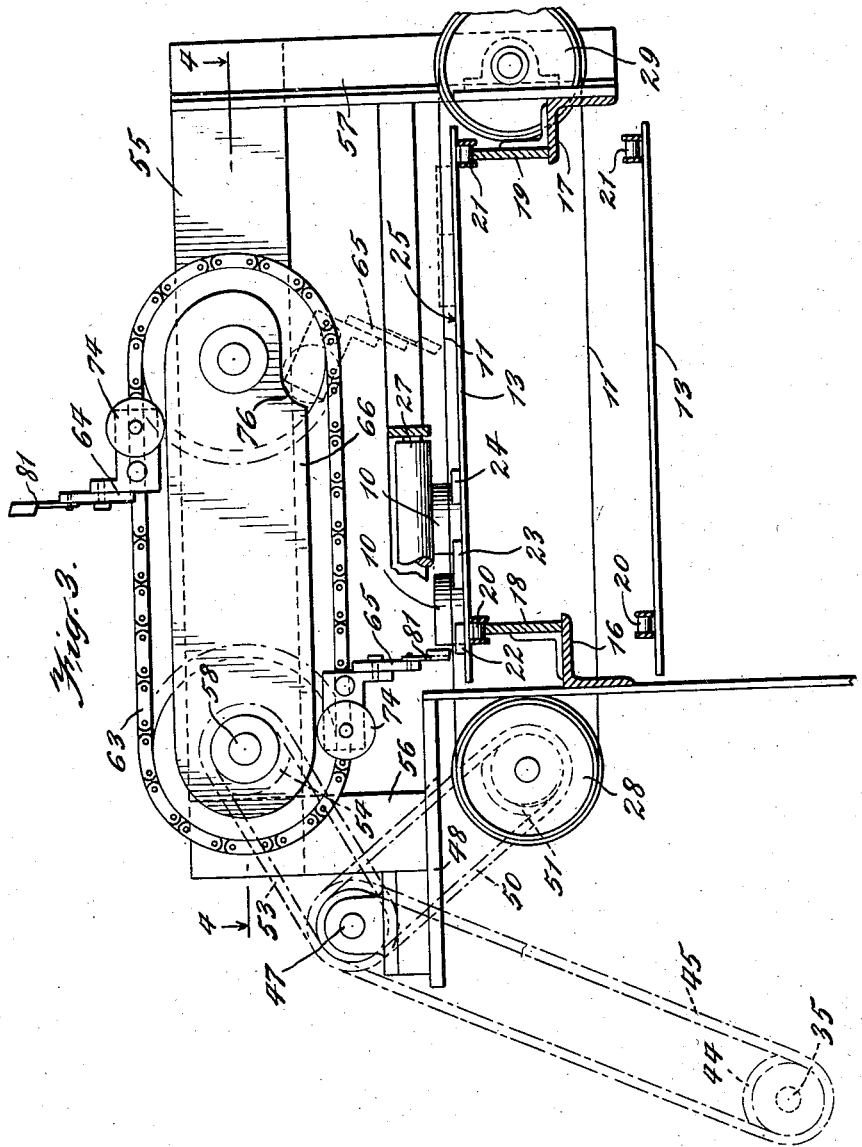

2,380,564

UNITED STATES PATENT OFFICE 2,380,564

CAKE SLITTING MACHINE

William Wennmann, Baltimore, Md., assignor to Ward Baking Company, New York, N. Y., a corporation of New York Application July 26, 1944, Serial No. 546,719

9 Claims. (Cl. 146—72)

My present invention relates to improvements in a machine for slitting or cutting cakes into an upper and a lower part and separating them for the application of a filling material.

Heretofore in the commercial production of small filled cakes the cakes have been placed at regularly spaced intervals on a conveyor, such as a belt conveyor which is intermittently driven past a slicer which cut the cakes into an upper and a lower part or half and then into position below a device for dropping a quantity of filling material onto the lower half of the cake, the upper half having been removed by hand from between the slicing knife and the filling device. The removal of the top halves of the cakes by hand required an operator for this special purpose and also necessitated manual handling, which it is desirable to avoid.

My present invention provides means whereby the upper halves of the cakes may be removed from the lower halves, after slicing, automatically in timed sequence with the slicing and filling apparatus, leaving the lower half exposed to receive the filling material.

The mechanism for removing the upper half of the slit cakes is preferably driven from the source of power for operating the cake conveyor so that the upper halves may be removed during the period between the successive movements of the conveyor.

In my invention I provide a mechanism having one or more arms moving transversely of the direction of movement of the cakes on the conveyor and positioned to engage the upper halves of the cakes and sweep them sidewise to a part of the conveyor at one side of that on which the lower halves of the cakes are carried. This sidewise movement takes place as each cake in succession comes to a period of rest between movements in the path of the traveling arm or arms. After the upper halves of the successive cakes are thus pushed to one side of the lower part, the latter then pass to a position to receive a deposit of the filling material from a measuring device, while the upper parts are carried at the same time at one side past this measuring and filling device. After a quantity of filling material has been deposited on the lower half of the cake, the upper half may then be replaced by hand, or otherwise.

The arms for moving the upper halves of the cakes sidewise are carried on a transverse conveyor above the cake-carrying conveyor and driven continuously from the main drive of the apparatus. The arms in passing over the paths of the cakes are held in position by a guide rail, but after having moved to push the severed upper halves of the cakes free from the lower halves thereof the guide permits the arms to swing backwardly to clear the cakes.

The various features of my invention are illustrated by way of example in the accompanying drawings in which Fig. 1 is a side elevation of an apparatus for slicing the cakes, embodying a preferred form of the apparatus for removing the upper halves or parts of the slit or sliced cakes;

Fig. 2 is a plan view of the apparatus shown in Fig. 1;

Fig. 3 is an elevation of the apparatus taken from the right of Fig. 1;

Fig. 4 is a horizontal section taken on the line 4—4 of Fig. 3;

Fig. 5 is a side view partly in section of an arm for pushing the upper half of the slit cake from the lower half;

Fig. 6 is a horizontal section of the arm taken through its pivotal axis;

Fig. 7 is a side elevation of a part of the arm taken from the left of Fig. 5.

In the accompanying drawings the invention is illustrated by way of example as applied to a machine in which successive cakes 10 are carried in succession into contact with and past a horizontal slicing knife 11 and then into position below the filler-feeding element 12 by means of an endless chain or belt conveyor 13 which is trained about and supported at one end by an idler wheel and roller 14 and at the opposite end by a wheel 15 which is intermittently rotated to advance the conveyor step by step.

As shown in Figs. 1 and 3, the rollers 14 and 15 may be supported in fixed position on a pair of side rails 16 and 17, of any suitable workframe, and having upstanding rails 18 and 19 on which rest supporting rollers 20 and 21 of the cake conveyor belt 13.

In the specific embodiment illustrated the chain conveyor carries two small cakes 10 in side by side arrangement as illustrated in Fig. 2, but it will be understood that this is merely by way of example. The cakes are held in a definite position on the conveyor by means of upward projections or lugs 22, 23 and 24 at one side of the median line of the belt leaving an unoccupied space 25, Fig. 2, onto which the upper parts or halves of the cakes may be placed after being severed or sliced by the slicing knife 11.

The cakes 10 are placed in position on the conveyor 13 by hand and as the belt is advanced step by step they are brought beneath a pair of rollers 26 and 27, Figs. 1, 2 and 3, immediately above the knife 11, which thereby holds the cakes in position on the conveyor belt while being sliced. Thereafter the cakes leave the slicing knife, whereupon the upper part of the sliced cake is removed so that the lower part may be brought to a position below the filler feed device 12 to receive a deposit of the filling material as, for example, marshmallow, or other filling. Thereafter the upper parts or halves may be replaced to complete the two-layer cake or cake sandwich.

As shown in Fig. 3 the slicer knife may be a continuous band knife trained about a pair of pulleys 28 and 29 with the upper portion of the knife blade 11 about midway of the height of the cakes 10 and sufficiently high to clear the projections 22, 23 and 24.

The details of the filler-feeding device 12 are not shown as these details are not required for an understanding of the present invention.

The cake conveyor 13 is driven intermittently or by a step by step motion so that it may have a period of rest, with cakes below the filling measuring device 12, during which a quantity of the filling material, as indicated at 30, may be dropped upon the cake.

For this purpose the cake conveyor is driven from a motor 31 through a belt 32, pulley 33 of a speed reduction gearing 34 which transmits a continuous rotary motion to a shaft 35 at a reduced speed. On the opposite end of the shaft 35 is a bevel gear 36 which meshes with a bevel gear 37 mounted on a shaft 38 at right angles thereto on which is fixed a crank arm 39. The crank arm 39 is connected by a link 40 to a rocking arm 41 carrying a pawl 42 which engages the teeth of a ratchet 43 secured on the shaft of the sprocket wheel 15 so that with each rotation of the crank arm 39 the arm 41 is swung back and forth to cause the pawl 42 to engage the ratchet and move the wheel 15 and belt intermittently.

Also mounted on the shaft 35 is a sprocket 44 which is connected by a chain 45 to a sprocket 46 mounted on a jack shaft 47. The jack shaft 47 is mounted on a bracket 48 extending sidewise from one of the supporting rails or arms 16 as shown in Fig. 3. On the jack shaft 47 is also mounted a sprocket wheel 49 connected by a chain 50 to a sprocket wheel 51 which is keyed to and drives the pulley 28 of the slicing knife which is thus driven continuously.

The jack shaft 47 also serves to drive the mechanism of my present invention. For this purpose a sprocket wheel 52 keyed on the shaft 47 is connected by means of a chain 53, as shown in Figs. 1, 2 and 3, to a sprocket wheel 54 above the cake conveyor belt 13.

The sprocket wheel 54 which serves as the driving wheel for the device of my invention is supported on a transverse beam 55 above the upper flight of the cake conveyor belt which is, in turn, supported by an upright 56 on the bracket 48 and an upright 57 secured to the supporting rail 17.

As shown more particularly in Figs. 2 and 4, the sprocket wheel 54 is secured on a shaft 58 journalled in bearings 59 on the cross-beam 55 and has keyed or otherwise secured at its free end a double sprocket wheel 60. A double idler sprocket wheel 61 is also mounted on the cross-beam 55 on the opposite side of the path of cakes 10 or above the space 25. Trained about the double sprocket wheels 60 and 61 are a pair of sprocket chains 62 and 63 carrying paddles or arms 64 and 65 transversely of the cake conveyor 25, as in Fig. 3, in such a manner that the lower part of the arms in each transverse movement engages the upper half or part of the sliced cake 10 and moves it from the position at the left of Fig. 3 to the position on the space 25, indicated in dotted lines; meanwhile the arm will have tilted backwardly upon reaching the position shown in dotted lines in Fig. 3 to clear the upper half of the cake which has been pushed onto the space 25.

In the example shown in the accompanying drawings the mechanism has been shown as carrying two arms but it will be understood that this is merely by way of example and that one or more arms could be used by suitable adjustment of the apparatus.

It will be noted that the sprocket chains 62 and 63 and the pusher arms 64 and 65 move continuously. They are, however, so geared to the driving mechanism that the arm will move from the position shown in full lines in Fig. 3 to that shown in broken lines while the cakes are stationary, that is, while the pawl 42 is being moved clockwise, as in Fig. 1, and while a pair of cakes is in position to receive the filling material from the filling device 12.

The arms 64 and 65 are mounted on the sprocket chains 62 and 63 in such manner that they can tilt backwardly and are biased or pressed to tilt backwardly.

They are held in an upright position during their passage from the position shown in full line to that shown in dotted line in Fig. 3 by means of a guide plate 66 mounted between the sprocket chains 62 and 63 and secured to the cross-beam 55 by a block 67 as shown in Fig. 4. Each arm is held against the periphery of the guide plate 66 by a spring and cam follower shown in detail in Figs. 5, 6 and 7.

As shown in Figs. 5, 6 and 7, the arms 64 and 65 are supported on and between the sprocket chains 62 and 63 by means of a pin 68 extending between links of the chains and held from turning therein by having one end squared and fitting in a squared socket in the link. A collar 69 is fixed on the pin 68 and serves to anchor one end of a coil spring 70 encircling the pin, the other end of which is engaged in a lever 71 having a horizontal arm 72 and a vertical arm 73 as shown in Fig. 5. The spring 70 tends to tilt the lever 71 clockwise, as viewed in Fig. 3, or counterclockwise, as viewed in Fig. 5, thus tending to rotate it to the position shown in broken lines in Fig. 3.

During its travel from the position shown in full lines in Fig. 3 the lever 71 is held in upright position by means of a roller 74 secured by a pin 75 on the arm 72 and resting against the peripheral edge of the guide 66. The lower edge of the guide 66 is, however, notched or recessed upwardly at 76 so that when the arm reaches the position shown in broken lines in Fig. 3 the roller 74 rides upwardly and the arm tilts under the action of the spring 70 to permit it to clear the displaced portions of the cakes and avoid showing them over the edge of the conveyor or crumbling them.

It is desirable that the lower part of the arm be at a position to just clear the lower portion of the cakes 10. To enable them to be set to a proper position for this purpose the downwardly extending arm 73 is provided with a ridge 77 on which fits the complementary grooved upper part 78 of the arm which is secured to the arm 73 by means of a screw 79 passing through a slot 80 in the part 78 and secured to the arm 73. The arm 78 has a downwardly extending member 81 widened at its lower end to engage the upper parts of the cakes. By lessening the tension of the screw 79 the arm 78 may be adjusted vertically and then secured by again tightening the screw.

Through the above mechanism the lower part of the arm 81 is moved in timed relation to the movements of the cake conveyor 13 to sweep transversely of the latter and push the upper halves of the severed cakes to one side between the movements of the conveyor, and while the cakes are stationary. This accomplishes the removal of the severed half of the cake with a minimum of handling and leaves it in a convenient position on the conveyor for replacement after a measured quantity of the filling material has been placed or dropped onto the lower halves of the cakes.

What I claim is:

1. Apparatus for removing the upper parts of cakes for filling which comprises a cake conveyor having means for holding cakes at regularly spaced intervals thereon, means for advancing said conveyor step by step to bring successive cakes to position for filling, a slicing knife spaced above said conveyor to slice cakes carried thereon into upper and lower parts, a conveyor positioned transversely above said cake conveyor, an arm carried by said transverse conveyor to pass above said cake conveyor in position to engage and push sidewise the upper part of a cake after slicing and a common driving means for said conveyors.

2. Apparatus for removing the upper parts of cakes for filling which comprises a cake conveyor having means for holding cakes at regularly spaced intervals thereon, a driving means for advancing said conveyor step by step to bring successive cakes to a position for filling, a slicing knife spaced above said conveyor to slice cakes carried thereon into an upper and a lower part, a conveyor positioned transversely above said cake conveyor, an arm carried by said transverse conveyor to pass transversely above the cake conveyor to engage the upper part of a cake after slicing and means driven from said cake conveyor driving means to drive said transverse conveyor in relation to said cake conveyor to cause said arms to engage and move said upper parts between periods of movement of said cake conveyor.

3. Apparatus for removing the upper parts of cakes for filling which comprises a cake conveyor having means for holding cakes at regularly spaced intervals thereon, means for advancing said cake conveyor step by step to bring successive cakes to a position for filling, a slicing knife spaced above said conveyor to slice successive cakes carried thereon each into an upper and a lower part, a guide plate mounted transversely above said cake conveyor, and having a shaped periphery, an arm guided by the periphery of said guide to move transversely of said cake conveyor at a distance thereabove to push sidewise thereon the severed upper parts of said cakes and means driven by the cake conveyor means to move said arms transversely between the successive movements of said cake conveyor.

4. The apparatus of claim 3 in which the surface of said guide is notched to permit said arm to tilt out of engagement with said cakes after they have been pushed from the lower halves thereof.

5. Apparatus for removing the upper parts of cakes for filling which comprises a cake conveyor having means for holding cakes at successively spaced intervals thereon and means for slicing said cakes horizontally into an upper and a lower part, a guide plate positioned transversely of the direction of movement of said cakes on said cake conveyor, and having a cam surface, a pivoted lever movable transversely of said cake conveyor and having one arm bearing against said cam surface and the other arm extending downwardly in position to engage and push sidewise the upper parts of said severed cakes and means driven synchronously with said cake conveyor to move said lever about said cam surface.

6. Apparatus for removing the upper parts of cakes for filling which comprises a cake conveyor having means for holding cakes at successively spaced intervals thereon and means for slicing said cakes horizontally into an upper and a lower part, a guide plate positioned transversely of the direction of movement of said cakes on said cake conveyor, and having a cam surface, a pivoted lever removable transversely of said cake conveyor and having one arm bearing against said cam surface and the other arm extending downwardly in position to engage and push sidewise the upper parts of said severed cakes and means driven synchronously with said cake conveyor to move said lever about said cam surface, resiliently acting means to hold said lever arm against said cam surface, said cam surface being recessed in a position to permit said lever to tilt backwardly out of engagement with said upper cake part after pushing said cake parts free of the lower parts of said cakes.

7. Means for displacing the upper parts of horizontally severed cakes on a moving cake conveyor which comprises an arm extending downwardly above said cakes in position to engage the upper halves of said severed cakes, means to move said arms transversely of the direction of movement of said cakes on said cake conveyor to displace said upper parts of said cakes sidewise of their direction of movement, a guide for holding said displacing arms in vertical position for passing over the lower parts of said cake and having a notch to permit said arm to tilt backwardly after passing over said lower halves of said cakes and a spring for holding said arm into engagement with said guide and tilting it into said notch.

8. Means for displacing the upper parts of horizontally severed cakes on an intermittent cake conveyor which comprises a pair of sprocket chains above and transverse to the direction of movement of said cake conveyor, a guide plate between said chains and having a cam shaped periphery, downwardly depending cake engaging arms pivoted between the links of said chains and having an extension engaging the cam surface of said guide to hold said arms in vertical position to engage the upper halves of said cakes while passing over the lower halves thereof, a spring between said links and said arm to hold said arm against said guide surface, said guide surface being notched to permit said arm to swing backwardly out of engagement with said cakes after passing over the lower parts of said cakes on said conveyor.

9. Means for displacing the upper parts of a horizontally sliced cake on a cake conveyor which comprises a pair of sprocket chains mounted transversely above said cake conveyor, a pin extending between said chains and non-rotatably secured in said chain, an arm pivotally mounted on said pin, a collar fixed on said pin, a coil spring encircling said pin and fixed at one end to said collar and at the other end to said arm, a guide plate between said chains and having a cam shaped periphery, said arm having a roller bearing against said periphery and held thereagainst by said spring.

WILLIAM WENNMANN.